United States Patent [19]

Glaenzer

[11] 3,805,058

[45] Apr. 16, 1974

[54] RADIATION SENSITIVE TRANSDUCER

[75] Inventor: Richard H. Glaenzer, Bridgeton, Mo.

[73] Assignee: McDonnell Douglas Corporation, St. Louis, Mo.

[22] Filed: Mar. 26, 1971

[21] Appl. No.: 128,279

[52] U.S. Cl.. 250/203 CT, 250/213 VT, 250/211 J, 313/95
[51] Int. Cl. .............................................. G01j 1/20
[58] Field of Search .......... 250/204, 213 VT, 211 J, 250/203 CT, 217 CR, 83.3 H, 338, 349; 313/95

[56] References Cited
UNITED STATES PATENTS

| 3,581,098 | 5/1971 | Hoover | 250/213 VT |
| 3,693,013 | 9/1972 | Dueker | 250/203 R |
| 3,333,145 | 7/1967 | Nielsen | 313/65 X |
| 3,628,080 | 12/1971 | Lindequist | 250/213 VT X |
| 3,028,500 | 4/1962 | Wallmark | 250/211 J |
| 3,351,493 | 11/1967 | Weiman et al. | 250/211 J X |
| 2,839,699 | 7/1958 | Szegho et al. | 250/213 VT X |
| 3,609,433 | 9/1971 | Freedman | 250/213 VT X |
| 3,619,496 | 11/1971 | Lichtenstein | 250/213 VT X |

Primary Examiner—Walter Stolwein
Attorney, Agent, or Firm—Charles B. Haverstock

[57] ABSTRACT

A radiation sensitive transducer combining a photo-cathode and a lateral photoelectric detector to increase the sensitivity and gain, said transducer being operable in several different modes and being particularly useful in tracking applications.

19 Claims, 6 Drawing Figures

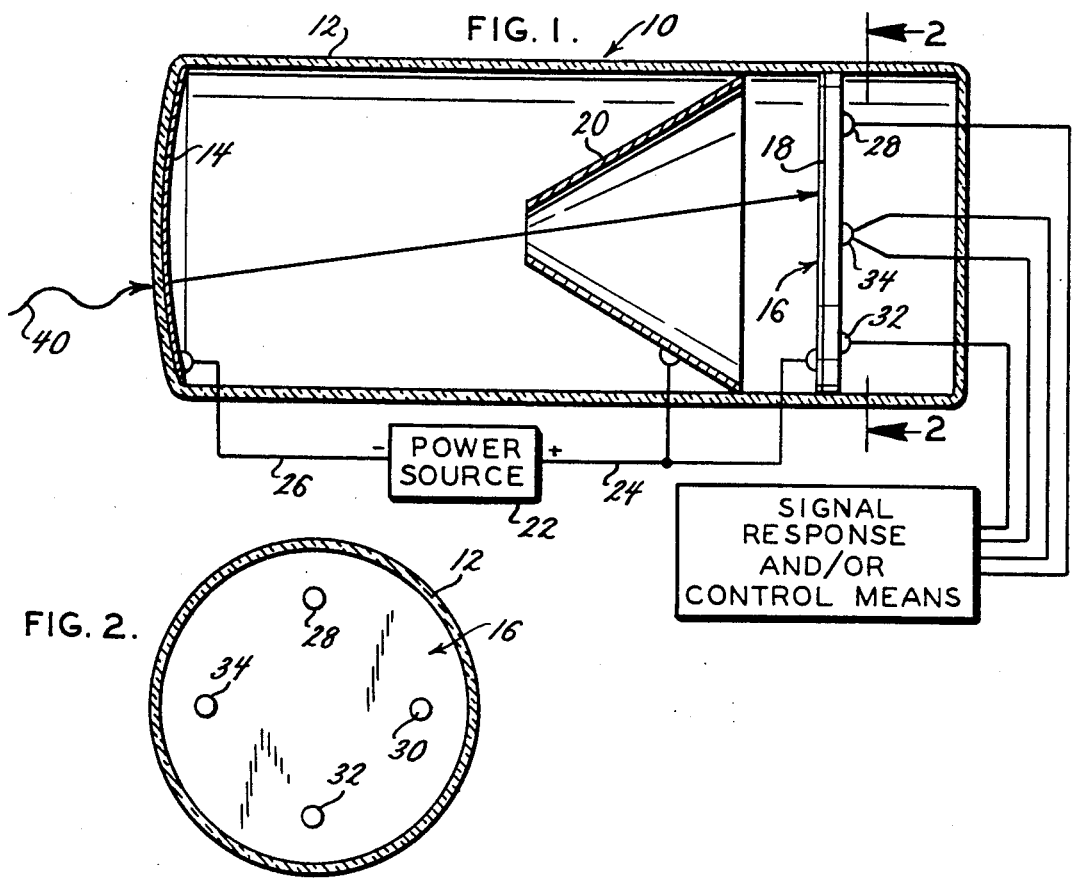
FIG. 1.
FIG. 2.
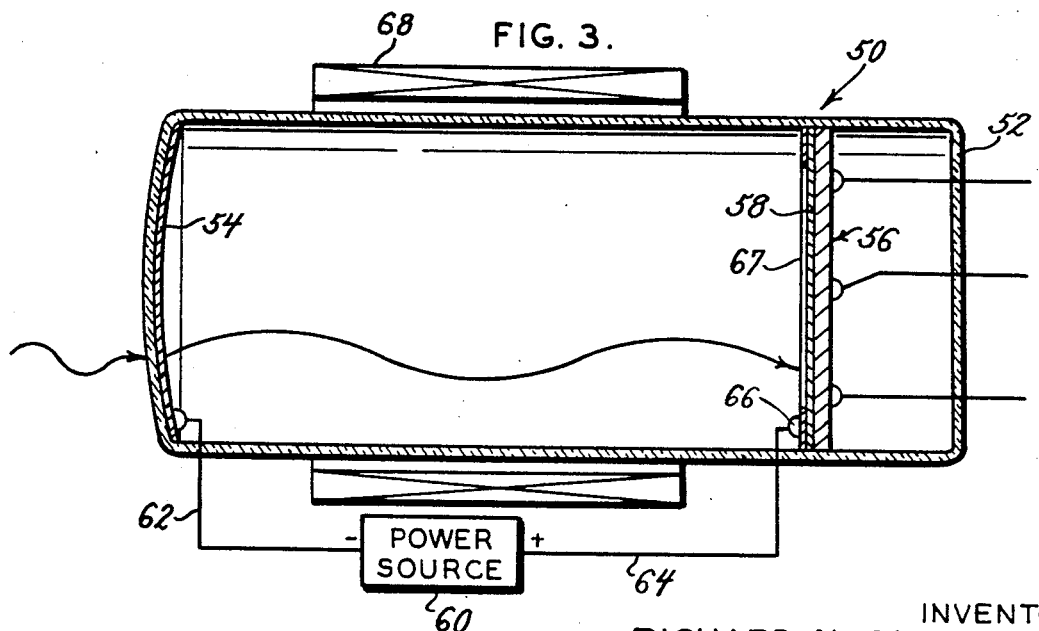
FIG. 3.
INVENTOR
RICHARD H. GLAENZER
BY
Charles B. Havrstock
ATTORNEY

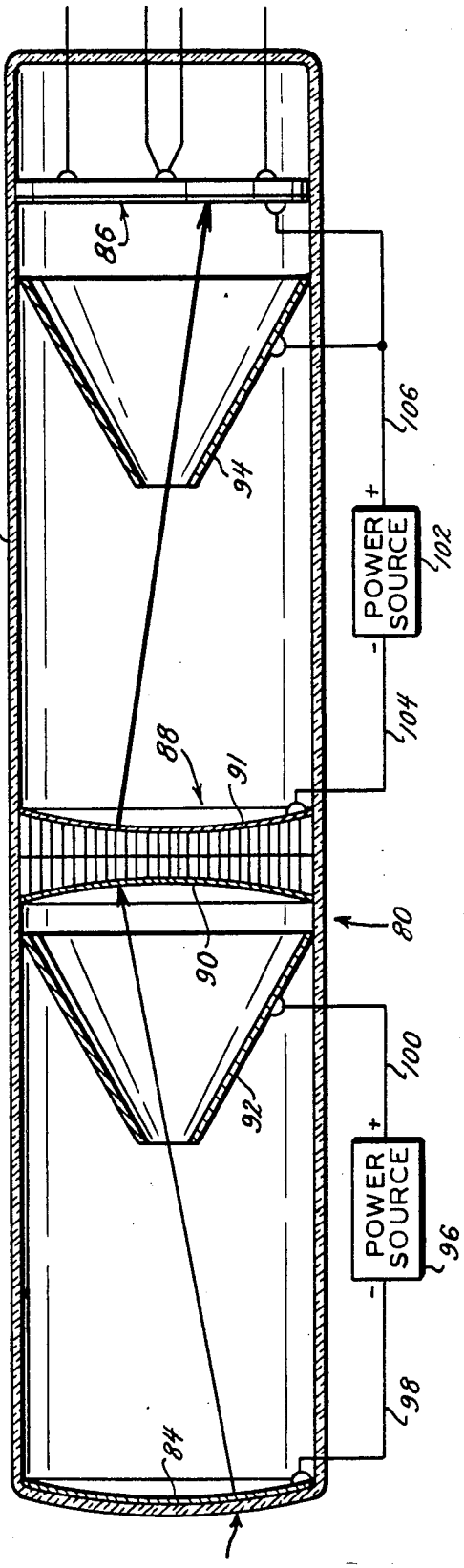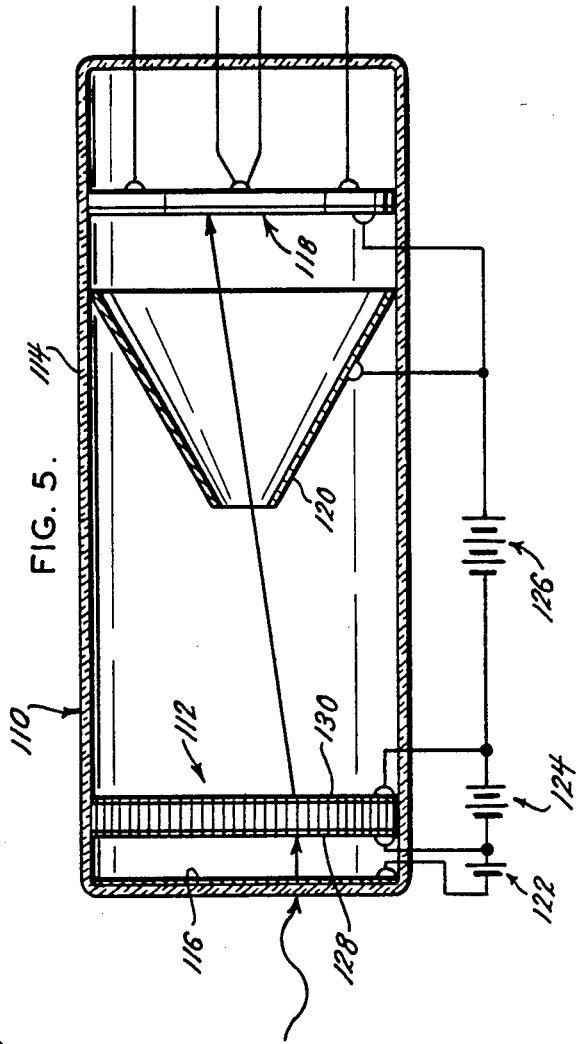

INVENTOR
RICHARD H. GLAENZER
BY Charles B. Haverstock
ATTORNEY

RADIATION SENSITIVE TRANSDUCER

There are many radiation sensitive devices including photocathodes and lateral photoelectric detector devices, and some of the known devices are used in tracking applications including responding to light coming from a remote source or location that is being tracked. For the most part, however, the known devices have limited sensitivity and for this and other reasons are unable to follow or track relatively weak signals usually in the form of light radiations and reflections and therefore their usefulness is limited. Furthermore, because of the limited sensitivity of the known devices, the known devices are apt to be adversely effected or dominated by radiation sources other than those from the target being tracked and may be incapable of distinguishing between a desired light source and a light source from some other object or source in the field of view. For these and other reasons, the known devices have not received wide usage and application, have not been sensitive enough for many purposes, and have been subject to errors including errors in following wrong targets or rdiations present in the field of view. The present invention overcomes these and other deficiencies and shortcomings of the prior art by teaching the construction and operation of a much more sensitive transducer, and particularly a radiation sensitive transducer capable of tracking or following objects and capable of being operated automatically independently of an operator. Furthermore, the present device can be made to respond to particular light wave lengths and can distinguish between two or more radiation sources in the observed field of view, and it has substantially higher gain characteristics than other devices used for the same or similar purposes. In addition, the present device incorporates a relatively simple means for providing automatic gain control; an important consideration in situations where the radiation intensity varies. The present invention teaches the combination in a single transducer of a photocathode and a lateral photoelectric detector and incldes means for accelerating the electrons emitted by the photocathode or trajectories which cause them to impinge on the lateral photoelectric detector and to emit electron-hole pairs therein. The present device combines the aforesaid elements in such a way that it substantially increases its sensitivity and improves its gain characteristics enabling it to detect and follow particular light emitting or light reflecting objects even in a field of view which may include or be dominated by other light emitting and/or reflecting members.

It is therefore a principal object of the present invention to provide improved radiation sensitive means.

Another object is to combine in a single radiation tracking transducer pohtocathode and lateral photoelectric detector means.

Another object is to substantially increase the gain of radiation tracking transducers and like devices.

Another object is to provide a relatively simple transducer that is capable of accurately following or locating objects in a field of view.

Another object is to provide a relatively simple and inexpensive radiation tracking transducer having improved sensitivity and gain characteristics.

Another object is to improve the lateral photo-effect of light sensitive transducer devices and the like.

Another object is to incorporate a relatively simple method of providing automatic gain control.

Another object is to provide electron accelerating and/or electron focusing means in a radiation tracking transducer.

Another object is to provide means to operate the subject device in combination with image intensifier means to further increase the gain characteristics.

These and other objects and advantages of the present invention will become apparent after considering the following detailed specification which discloses preferred embodiments thereof in conjunction with the accompanying drawings, wherein:

FIG. 1 is a cross-sectional view taken through the center of a radiation tracking transducer constructed according to the present invention;

FIG. 2 is a cross-sectional view taken on line 2—2 of FIG. 1;

FIG. 3 is a view similar to FIG. 1 but showing a modified form of the subject transducer;

FIG. 4 shows another embodiment of the subject transducer in combination with image intensifier means;

FIG. 5 shows still another embodiment in combination with channel multiplier means; and, FIG. 6 shows still another embodiment with the addition of grid means for providing automatic gain control.

Figure 6:
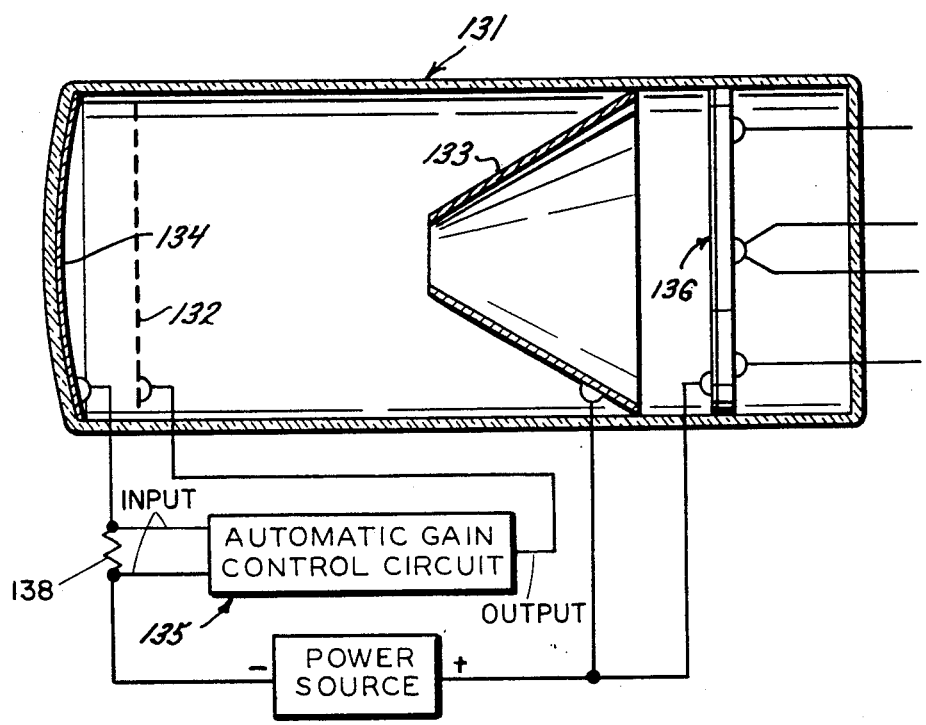

Referring to the drawings more particularly by reference numbers, number 10 refers to a radiation sensitive transducer constructed according to the present invention. The transducer 10 includes a vacuum sealed envelope or container 12, one wall of which has a layer of materials thereon which forms a photocathode 14. The photocathode 14 can be constructed of a number of different known materials the selection of which depends on the wavelength of the light to be detected, and the wavelength sensitivity of the photocathode 14 is determined by the spectral response thereof. The photocathode 14 is located on the end of the tube 12 that faces toward the field of view being observed, and the field of view will include emitted or reflected light coming from a particular object or target.

A semi-conductor lateral photoelectric detector 16 is mounted inside of the tube envelope 12 near the opposite end thereof from the photocathode 14. The detector 16 may also be constructed of known materials such as known semi-conductor materials which are so arranged during construction that they form a barrier such as a Schottky barrier therebetween. In the construction as shown, the barrier 18 is located on or near the surface thereof that faces the photocathode 14.

An anode member 20, shown as being an annular metal wall member of frusto-conical shape, is positioned inside the envelope 12 between the photocathode 14 and the detector 16. The anode 20 is constructed and positioned so that all portions of the photocathode 14 can see at least some portion of the surface of the detector 16. A relatively high voltage source 22 has its positive output terminal connected to the anode 20 and to the barrier surface of the detector 18 by lead 24 and its negative output terminal connected by lead 26 to the photocathode 14. The high voltage on the anode 20 causes the anode to act as an acceleration anode to accelerate electrons given off by the photocathode 14 toward the detector 16. The anode connection to the barrier surface of the detector provides a return path for electrons to the power source.

The detector 16 as shown as hour spaced quadrature electrodes or terminals 28, 30, 32 and 34 arranged in spaced pairs 28 and 32 and 30 and 34, see FIG. 2 of the drawing. The electrodes 28–34 are connected by associated leads to suitable associated nulling and/or indicator means identified in FIG. 1 as the block with the legend "Signal Response and/or Control Means."

When emitted or reflected light in the form of the light ray 40 from a remote location impinges on the photocathode 14, electrons are given off inside the tube 12 in the area where the light impinges. The electrons thus emitted are accelerated and focused as they move in the tube due to the high voltage present on the anode 20 and impinge on the barrier surface 16 to generate electron-hold pairs in the region thereof defined between the electrodes 28–34, sometimes called the depletion region, and within the diffusion length of the said region thereby introducing a lateral photoeffect in the detector 16. This photoeffect is the same as would occur if the light spot from the remote location had impinged directly on the detector 16 without having first impinged on the photocathode 14 except that it would be much less intense. An electron-hole pair will be generated in the detector 16 for approximately each 3.5 electron volts (eV) of energy of the photo-emitted electron. In other words, those electron-hole pairs which are generated in the detector depletion region, or within a diffusion length thereof as measured into the detector, produce the lateral photoeffect in the same way as if the spot of light had impinged directly on the detector. As an example, if the cathode-anode voltage of the source 22 is selected to be 10,500 volts, then approximately 3,000 electron-hole pairs will be generated in the detector 16, a result obtained by dividing 10,500 by 3.5. If all of the electron-hole pairs are generated in the sensitive region of the detectors 16, a gain of approximately 3,000 will be realized. If the quantum efficiency of the photocathode 14 and of the lateral photoelectric detector 16 are close to 1 or unity, the calculated gain of 3,000 represents the improvement obtained by the present device as compared to other radiation tracking devices that employ only lateral photoelectric detectors but do not have photocathodes operated in conjunction therewith as disclosed herein.

The wavelength sensitivity of the subject device as already indicated is determined by the spectral response characteristics of the photocathode 14, and this in turn depends upon the particular material or materials selected for the construction of the photocathode. There are many known materials that could be selected for use in the construction of the photocathode including among others, materials such as the bialkalins, certain cesium compounds, gallium arsenide, and other semi-conductor materials, each of which has its own distinct spectral response characteristics.

FIG. 3 shows a modified embodiment 50 of the subject transducer which, like the embodiment above, includes a vacuum sealed envelope 42, a photocathode 54 formed on one surface of the envelope 52, and a lateral photoelectric detector element 56 which is similar to the detector 16 including having a barrier junction such as barrier 58 positioned therein. A high voltage source 60 has its negative terminal connected to the photocathode 54 by lead 62 and its positive terminal connected by lead 64 to terminal 66 which is attached to a peripheral conductive layer 67 formed on the detector 56 at a location such as shown. In the modified construction, the high voltage is therefore connected directly between the photocathode 54 and the detector 56 rather than between the photocathode and the acceleration anode 20 as in the construction 10 described above. This means that the main acceleration force provided in the modified construction is produced by the high positive voltage established on the conductive layer 67. The modified construction also has an annular focusing magnet 68 which is positioned extending around the outside of tube envelope 52. The coil or magnet 68 operates in a manner similar to the focusing coils used on certain kinds of cathode ray tubes including certain kinds of television picture tubes. The operation of the modified construction of FIG. 3 is similar to the operation of the device shown in FIG. 1 and produces similar results. For example, when incoming light impinges on the photocathode 54 it causes the photocathode to emit electrons which are accelerated toward the detector 56 by the voltage thereon and which are focused during said movement by the operation of the coil 68. These electrons, when they impinge on the detector 56, generate electron-hole pairs in the detector 56 which in turn produce voltages at the several output quadrature terminals connected to the detector, and these voltages will vary depending on the distance between where a light spot impinges on the detector and the various quadrature electrodes. The signals or voltages thus produced can be used to cause the device to track or follow an object in the field of view, or they can be used for many other purposes such as in aiming, sighting, tracking, star finding, star tracking, locating objects and for many other applications. It also has application in television as a means for a television camera to automatically follow a particular object or target and for many other purposes.

It is also contemplated to construct the subject device so that it can be operated in conjunction with other light producing or light amplifying devices in cascade therewith such as with an image intensifier device as shown in FIG. 4. The construction 80 shown in FIG. 4 is similar to the construction 10 described in connection with FIG. 1 including having a vacuum sealed envelope or tube 82 similar to the tube 12 with a photocathode 84 formed on one end surface thereof and a lateral photoelectric detector 86 located in the envelope near the opposite end. An image intensifier, sometimes called light amplifier 88, is included in the device 80 and is shown positioned at an intermediate location between the elements 84 and 86. The image intensifier 88 is included to amplify or intensify the electrons that impinge on it from the photocathode 84 to thereby intensify the input to the detector 86 and increase the overall gain. Any number of similar image intensifiers can be provided as required without departing from the spirit and scope of the invention.

The image intensifier 88 may be of conventional construction including being a wafer-like element having an electroluminescent phosphor layer 90 positioned on the side thereof in position to be exposed to electrons from the photocathode 84, and a photocathode layer 91 similar to the photocathode 84 on the opposite side. It can also be constructed as an optical fiber coupled device having a phosphor screen layer. The embodiment 80 as shown is also provided with a first annular frusto-conical anode member 92 positioned in the space between the photocathode 84 and the image intensifier 88, and a second annular frusto-conical anode member 94 positioned in the space between the intensifier 88 and the detector 86. A first high voltage D.C. source 96 has its negative terminal connected by lead 98 to the photocathode 84 and its positive terminal connected by another lead 100 to the first anode 92. Similarly, a second high voltage D.C. source 102 has its negative terminal connected by a lead 104 to the photoconductive or photocathode side of the intensifier 88 and its opposite or positive output terminal connected by a lead 106 to the anode 94 that is located adjacent to the detector 86.

The construction 80 operates similarly to the construction 10 except that the electrons emitted by the photocathode 84 instead of impinging directly on the detector 86, impinge instead on the input phosphor surface 90 of the intensifier 88 and are amplified therein so that a more intense output of electrons is emitted therefrom. The electrons thus emitted by the intensifier 88 are further accelerated and focused by the high voltage on the second anode 94 before finally impinging on the detector 86. Overall the operation of the device 80 is similar to the operation of the device 10, the principal difference being in the inclusion of the intensifier means 88 which enable it to detect much weaker signals.

FIG. 5 shows another embodiment 110 which is also similar to the device 10 shown in FIG. 1 but is modified to include a channel multiplier plate 112 which is located inside of its tube 114 adjacent to the photocathode 116 which is on the forwardly facing surface thereof. The modified construction 110 also has a lateral photoelectric detector 118 located near the opposite end of the tube from the photocathode 116 and an annular frusto-conical anode 120 positioned therebetween. The device 110 is shown having three D.C. voltage sources including one 122 connected between the photocathode 116 and the adjacent side of the multiplier plate 112, a second 124 connected between opposite sides of the multiplier plate 112, and a third 126 connected between the adjacent or near side of the plate 112 and the acceleration-focusing anode 120 and the detector 118.

The channel multiplier plate 112 is formed by a bundle of hollow tubes which operate to multiply or intensify the electron beam that impinges thereon from the photocathode 116 in a manner somewhat similar to a photomultiplier tube. The tubes in the bundle of tubes which make up the channel multiplier plate 112 have both of their opposite end surfaces coated with layers 128 and 130 of conductive material which forms a grid and yet leaves the tubes open from end to end. Such devices are known in the art and the structural details thereof are not part of the present invention.

FIG. 6 shows another embodiment 131 which is also similar to the device 10 shown in FIG. 1 but is modified to include a grid 132, which is located between an anode 133 and a photocathode layer 134. A negative potential is applied to the grid 132 with respect to the cathode 134 by means of a circuit which is identified as automatic gain control circuit 135. The automatic gain control circuit 135 provides negative feedback to the photocurrent by sensing the current in the photocathode circuit via the voltage across the resistor 138, amplifying this voltage and applying the output with a negative polarity to the grid 132. When the input light intensity is high, the photocurrent tends to increase but the increased negative voltage on the grid 132 suppresses any increase in photocurrent. In some applications, the radiation impinging on the photocathode may be in the form of very short pulses (10 to 20 nanoseconds) at a relatively slow repetition rate. In such cases, the automatic gain control must be sufficiently fast to suppress large current pulses before they peak. If the subject radiation sensing transducer were mounted on a middle or other moving object which is seeking laser illuminated target, the radiation power will increase as the missile approaches the target. The automatic gain control circuitry under such circumstances functions by adjusting the bias of the grid 132 on the basis of the total photocathode current produced by the previous pulse or by the average photocurrent of several previous pulses. When the photocurrent increases above a preset threshold voltage, the magnitude of the grid bias voltage will increase to such an extent that succeeding photocurrent pulses are diminished. Conversely, if the photocurrent decreases below another preset threshold voltage, the magnitude of the grid bias voltage will decrease so that succeeding photocurrent pulses are further amplified. Input signals to the automatic gain control circuit 135 may be derived from a variety of different sources such as by means (not shown) that sense the total cathode current, or by means (also not shown) that sense the output of the detector 136. Other types of sensing means can also be used depending upon the particular application for which the device is to be used.

The important contribution made by the present invention is that it provides means for accurately locating and/or following a remote object or target in a field of view, which object or target is distinguishable from its surroundings in some way such as by its light emitting and/or reflecting characteristics including the frequency and other characteristics of its reflected or emitted light, and the present means can accomplish this with a high degree of accuracy and precision. The present device can also be made to respond to a wide dynamic range of incident light and in situations where the particular light from the object or target as aforesaid is distinguishable from other light that may be present including background light in some way as by its frequency or wavelength characteristics.

Thus there has been shown and described a novel radiation sensing or tracking transducer which fulfills all of the objects and advantages sought therefor. Many changes, modifications, variations, and other uses and applications of the subject device will, however, become apparent to those skilled in the art after considering this specification and the accompanying drawings. All such changes, modifications, variations and other uses and applications which do not depart from the spirit and scope of the invention are deemed to be covered by the invention which is limited only by the claims which follow.

What is claimed is:

1. A light sensitive instrument comprising means forming an evacuated chamber including a tube having a wall positioned to face in the direction of an observed field of view including in said observed field of view an object distinguishable by the light it gives off, a layer of light sensitive material formed on the inner surface of said tube wall, said light sensitive material emitting electrons inside the tube from areas thereof where light from the object in the field of view impinges, a wafer-like photoelectric detector element positioned inside the tube in spaced relation to said wall and in position to be bombarded by the electrons given off by the light sensitive material, all portions of the light sensitive layer being in line-of-sight with at least some portion of the detector element so that only those electrons emitted by the light sensitive material in line-of-sight between the light emitting object and the detector element will be able to reach the detector element, said detector element being a semi-conductor wafer-like element having a first surface to face the light sensitive layer and an opposite surface having a plurality of spaced connections thereto in which electric output signals are produced in response to electrons impinging thereon, the signals produced varying inversely with the distance from the respective connections to where the electrons impinge and the quantity of impinging electrons, and means including a source of potential for establishing an electric potential difference across at least a portion of the space between the light sensitive layer and the detector element for predeterminately accelerating the electrons given off by the light sensitive material as they travel toward the detector element.

2. The light sensitive instrument defined in claim 1 wherein the means for accelerating electrons include an anode member positioned inside the evacuated chamber at an intermediate location in the space between the layer of light sensitive material and the detector element, means for establishing a relatively equal potential region in the evacuated chamber between member and the detector element and means biasing the anode member and the detector element to an electrical potential that is more positive than the potential of the light sensitive layer.

3. The light sensitive instrument defined in claim 1 wherein the means for accelerating electrons include means for establishing a potential on the detector element that is more positive than the potential on the light sensitive layer, and other means establishing a magnetic field in the space between said light sensitive layer and said detector element.

4. The light sensitive instrument defined in claim 1 wherein said photoelectric detector element includes a layered member with a barrier layer formed therein adjacent to the first surface, said plurality of spaced connections being arranged on said detector element in spaced pairs on opposite surface of a central region thereof.

5. A light responsive transducer comprising an evacuated tube having a wall surface positioned thereon to be exposed to incoming light from an observed field of view, a layer of photosensitive material forming a photocathode positioned on said wall inside the tube surface, said photocathode emitting electrons in the tubes from areas thereof that are exposed to light in the observed field of view, a photoelectric detector element positioned inside the tube in spaced relationship to the photocathode, said detector element including a wafered semi-conductor member having a first barrier forming surface facing the layer of photosensitive material to be exposed to the electrons given off thereby when light impinges thereon from the observed field of view, the entire observed field of view being simultaneously and continuously observed during operation and being defined as a region which is in line of sight of the photoelectric detector through the photocathode so that electrons emitted by the photocathode in response to light present in the observed field of view can move substantially linearly to the detector and a second opposite surface with a plurality of spaced terminals arranged thereon in opposed pairs on opposite sides of a central region thereof, means for accelerating and focusing the electrons emitted by the photocathode to cause them to impinge on the detector element and produce output responses at the several terminals, said accelerating and focusing means including means for establishing a more positive potential on the detector element than is present on the photocathode, said responses varying with the lateral distance from the respective terminals to where the electrons impinge.

6. The transducer defined in claim 5 wherein said accelerating and focusing means include means establishing a magnetic field in the space between the photocathode and the detector element.

7. The transducer defined in claim 5 wherein said accelerating and focusing means include an anode member positioned at an intermediate location inside the evacuated tube between the photocathode and the detector element, said anode being a frusto-conical shaped annular member oriented to have its smaller diameter end closer to the photocathode. and means for applying a potential to the anode that is more positive than the potential of the photocathode.

8. The transducer defined in claim 5 including a D.C. voltage source having a negative potential connection to the photocathode and a positive potential connection to the detector element.

9. The transducer defined in claim 5 including image intensifier means positioned inside the tube in the space between the photocathode and the detector element.

10. The transducer defined in claim 9 wherein said image intensifier means include a layered structure having an electron sensitive layer positioned to be exposed to the electrons given off by the photocathode, and an opposite layer of an electron emissive substance which emits electrodes toward the detector element from regions thereof corresponding to where electrons impinge on the sensitive layer, and means positioned between the photocathode and the image intensifier means for accelerating and focusing the electrons given off by the photocathode.

11. The transducer defined in claim 10 including other means positioned between the image intensifier and the detector element for accelerating and focusing electrons emitted by the image intensifier means as they travel toward the detector element.

12. A light sensitive device including means forming an evacuated chamber, said means having a wall portion positioned thereon to face in the direction of a field of view to be observed, a layer of material positioned adjacent to said wall of an electron emissive substance which emits electrons therefrom when light from the field of view impinges thereon, a semi-conductor wafer-like photoelectric detector element positioned in the evacuated chamber in spaced relationship to the electron emitting layer, means positioned between the electron emitting layer and the photodetector element for amplifying the number of electrons emitted by the electron emissive layer that impinge on the detector element, said amplifier means including an electroluminescent phosphor image intensifier element means including an annular member positioned in the evacuated chamber at an intermediate location between the amplifier means and the detector element, and means to establish a realtively equal potential region between the annular member and the detector element and a relatively more negative potential on the amplifier means.

13. The light sensitive device defined in claim 12 including means for accelerating the electrons emitted by said image intensifier element, said acceleration means including an annular frusto-conical member mounted in the chamber between the intensifier element and the detector element.

14. The light sensitive device defined in claim 12 wherein said detector element includes a layered member having a first surface forming layer positioned to be exposed to the electrons emitted by the image intensifier element and an opposite surface, said opposite surface having a plurality of spaced terminals located in opposed pairs thereon, and a barrier formed in said detector element between said first and said opposite surfaces.

15. The light sensitive device defined in claim 12 wherein said image intensifier element includes a channel multiplier.

16. A light responsive transducer including an evacuated tube having a wall positioned to face in the direction of a field of view to be observed, light sensitive means adjacent to said wall, said means emitting electrons inside the tube from areas thereof where incident light from the field of view impinges, a photoelectric semi-conductor detector element positioned inside the tube in spaced relationship to the electron emitting means, said detector element including a barrier layer for exposing to the electrons emitted from the light sensitive means, said detector element having output connections at which output signals are produced when electrons impinge thereon, said output signals varying with the intensity and location of impingement of the electrons thereon, means positioned between the light sensitive means and the detector element for amplifying the intensity of the electron emission of said light sensitive means to increase the number of electrons that impinge on said detector element, said amplifying means including an electroluminescent phosphor member positioned so that its electroluminescent layer is exposed to the electrons from the electron emitting means, electron accelerating means including an annular member positioned between the amplifying means and the detector element, means to establish an equipotential region in the vacuum tube between the accelerating means and the detector element, and means to establish a more positive potential on the accelerating means than is present on the amplifying means.

17. The light responsive transducer defined in claim 16 wherein said amplifier means includes channel multiplier means.

18. A light sensitive instrument comprising means forming an evacuated chamber including a tube having a wall positioned to face in the direction of an observed field of view which may contain therein an object distinguishable by the light it gives off, a layer of light sensitive material formed on the inner surface of said tube wall, said light sensitive material emitting electrons inside the tube from areas thereon where light from the object in the field of view impinges, a photoelectric detector element positioned inside the tube in spaced relation to said wall and in position to be bombarded by the electrons given off by the light sensitive layer, said detector element having a plurality of spaced connections in which output signals are generated in response to the electrons impinging thereon, the output signals produced varying inversely with the distance from the respective connections to where the electrons impinge and directly with the quantity and intensity of the impinging electrons, means for predeterminately accelerating the electrons given off by the light sensitive material as they travel toward the detector element including means forming a positive voltage bias on the detector element relative to the light sensitive layer, and dynamic automatic gain control means including circuit means having an input connected to respond to the current flow in the light sensitive layer due to light impinging thereon, and an output, and means to control the flow of emitted electrons from the light sensitive layer to the detector element, said last named means including a control member positioned in the tube between the light sensitive layer and the detector element, and means to connect said control member to the output of the automatic gain control means.

19. The light sensitive instrument defined in claim 18 wherein said control member is a screen-like grid member positioned in the evacuated chamber in the space between the layer of light sensitive material and the photoelectric detector element, said automatic gain control means including means for applying a control potential to said grid member which has a particular relationship to the potential of the layer of light sensitive material.

* * * * *

UNITED STATES PATENT OFFICE
CERTIFICATE OF CORRECTION

Patent No. 3,805,058      Dated April 16, 1974

Inventor(s) Richard H. Glaenzer

It is certified that error appears in the above-identified patent and that said Letters Patent are hereby corrected as shown below:

Column 1, line 23, "rdiations" should be "radiations"; line 41, "incldes" should be "includes"; line 55, "pohtocathode" should be "photocathode".

Column 3, line 3, "hour" should be "four"; line 17, "electron-hold" should be "electron-hole"; line 61, "42" should be "52".

Column 6, line 11, "middile" should be "missile"; same line after "seeking" insert "a".

Column 7, line 55, after "wall" insert "surface"; same line, delete "sur-"; line 56, delete "face".

Column 9, line 4, "realtively" should be -- relatively --.

Signed and sealed this 26th day of November 1974.

(SEAL)
Attest:

McCOY M. GIBSON JR.
Attesting Officer

C. MARSHALL DANN
Commissioner of Patents